(No Model.)
G. A. LAMBERT.
PLOW COLTER CLAMP.
No. 491,895. Patented Feb. 14, 1893.
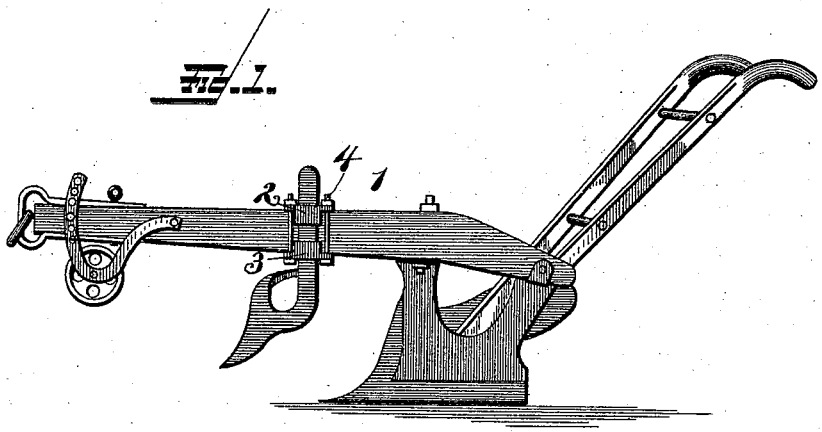
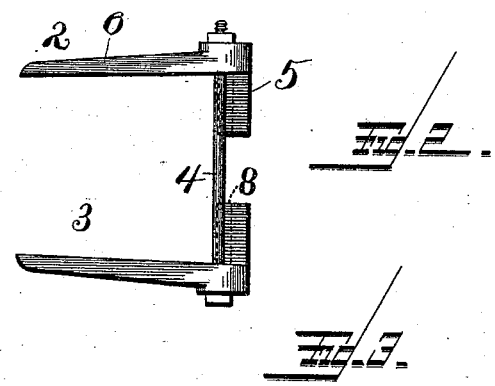
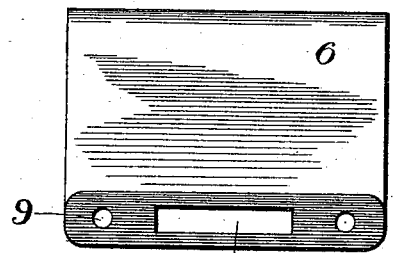
Witnesses
C. S. Frye
G. T. Myers
Inventor
G. A. Lambert
By Hopkins & Atkins
Attorneys

UNITED STATES PATENT OFFICE.

GEORGE A. LAMBERT, OF BELFAST, MAINE.

PLOW-COLTER CLAMP.

SPECIFICATION forming part of Letters Patent No. 491,895, dated February 14, 1893.

Application filed October 13, 1892. Serial No. 448,737. (No model.)

*To all whom it may concern:*

Be it known that I, GEORGE A. LAMBERT, of Belfast, county of Waldo, and State of Maine, have invented certain new and useful Improvements in Plow-Colter Clamps, of which the following is a specification, reference being had to the accompanying drawings.

The object of my invention is to produce a device for attaching a colter to the beam of a plow, which is readily and universally adjustable, and which does not weaken the beam in any respect.

In the accompanying drawings, Figure 1 is a side elevation of a plow with my clamp attached; Fig. 2 is an end view of the clamp detached, but with its parts occupying the same relative position as in use. Fig. 3 is a top plan view of one section of my clamp detached.

Referring to the figures on the drawings, 1 indicates the beam of a plow, to which is attached my clamp, which preferably consists of two sections 2 and 3, precisely similar in shape and size. It would be possible, for some kinds of work, to use a single section; but as the combination of the two clamps affords not only a firmer bearing, but the most convenient means of securing the clamp in place, I prefer the double form.

4 indicates bolts passing on the outside of the beam for uniting the sections together and completing the clamp. Each section consists of a bearing plate 5 and a clamping plate 6 preferably cast integrally with the bearing plate and forming an angle with it of a little less than ninety degrees.

7 indicates an aperture which passes through the bearing plate and forms a shouldered recess 8 in the inner side of the clamping plate. This aperture is designed to receive the shank of a colter, for example, and by the aid of the shouldered recess to hold it rigidly in position.

9 indicates bolt-holes, one on each side of the clamping plate. In one of the sections of the clamp these holes may be squared, if preferred, to receive a squared neck of a bolt.

In use, the sections being secured together by bolts of proper length, they are slipped upon the beam, as illustrated, and the nuts upon the bolts, are turned, to draw the plates close against the beam, the shank of the colter having been first set in place in the opposite apertures 7. As the nuts are screwed against the base-plates the clamping plates, in consequence of their inclination toward the base plates, are pressed firmly against the side of the shank of the colter and hold it securely in place. The inclination of the clamping plates to the base plates, respectively, is such that the action of the bolts and nuts in clamping the colter shank and the beam are substantially simultaneous, the necessary grip upon the beam being effected at the same time that the colter shank is securely caught by the bite of the clamping plates.

For adjusting the colter vertically, longitudinally, or laterally, all that is necessary is to loosen the nuts, set the parts in the desired position, and tighten the nuts together, all of which can be accomplished in a very short space of time.

While my device is specially adapted for carrying a colter upon a plow-beam, it may be used for other purposes as well; and in its broadest feature I desire to claim it simply as a clamp for securing anything like a colter shank, for example, to another part, as for instance a plow-beam.

What I claim is:—

1. A clamp consisting of the combination of a base-plate, an inclined clamping plate and an aperture through the base-plate in proximity to the clamping plate, through which a shank to be held may be passed, and means for securing the same upon a beam, for example, by tension exerted upon the base-plate, substantially as set forth.

2. In a colter clamp, the combination of a pair of clamp sections, each consisting of a base-plate and inclined clamping plate, an aperture through the base-plate and a shouldered recess in the clamping plate, a bolt-hole upon each end of the clamping-plate, and bolts and nuts for securing the parts together, substantially as and for the purpose specified.

In testimony of all which I have hereunto subscribed my name.

GEORGE A. LAMBERT.

Witnesses:
ARTHUR A. YOUNG,
R. F. DUNTON.